(12) United States Patent
Engström et al.

(10) Patent No.: US 10,739,234 B2
(45) Date of Patent: Aug. 11, 2020

(54) METHOD AND SYSTEM FOR USE IN DYNAMOMETER TESTING OF A MOTOR VEHICLE

(71) Applicant: ROTOTEST INTERNATIONAL AB, Rönninge (SE)

(72) Inventors: Nils G. Engström, Rönninge (SE); Jonny Färnlund, Skärholmen (SE); Christian Engström, Tyresö (SE)

(73) Assignee: ROTOTEST INTERNATIONAL AB, Rönninge (SE)

( * ) Notice: Subject to any disclaimer, the term of this patent is extended or adjusted under 35 U.S.C. 154(b) by 125 days.

(21) Appl. No.: 16/305,749

(22) PCT Filed: May 30, 2017

(86) PCT No.: PCT/SE2017/050573
§ 371 (c)(1),
(2) Date: Nov. 29, 2018

(87) PCT Pub. No.: WO2017/209681
PCT Pub. Date: Dec. 7, 2017

(65) Prior Publication Data
US 2019/0368972 A1    Dec. 5, 2019

(30) Foreign Application Priority Data
May 31, 2016    (SE) ........................... 1650758

(51) Int. Cl.
*G01M 17/007* (2006.01)
*G01L 3/20* (2006.01)

(52) U.S. Cl.
CPC ............. *G01M 17/007* (2013.01); *G01L 3/20* (2013.01)

(58) Field of Classification Search
CPC .......... G01M 17/007; G01L 3/20; G05B 5/00; H02P 29/00; H02H 9/041
(Continued)

(56) References Cited

U.S. PATENT DOCUMENTS 4,062,234 A * 12/1977 Bartlett, Jr. ............... G01L 3/18
73/862.11
4,092,855 A *  6/1978 Kinney ..................... G01L 3/18
73/862.09
(Continued)

FOREIGN PATENT DOCUMENTS

AT    512006 A1    4/2013
DE    4136508 A1    5/1993
(Continued)

OTHER PUBLICATIONS

Extended European Search Report in corresponding European Application No. 17807113.0 dated Dec. 19, 2019 (7 pages).
(Continued)

*Primary Examiner* — Octavia Hollington
(74) *Attorney, Agent, or Firm* — Venable LLP; Jeffri A. Kaminski

(57) ABSTRACT

A vehicle dynamometer system for dynamometer testing of a vehicle, comprises at least one dynamometer test unit having a power source, the power source comprising an output shaft arranged for, in use, rotation with a vehicle wheel shaft, the system further comprising an adapter plate, said adapter plate comprising fasteners for allowing fixed connection to a wheel hub of a wheel shaft being tested, said adapter plate further comprising fasteners for allowing fixed connection of the adapter plate to the output shaft of said dynamometer test unit to thereby connect the output shaft of the dynamometer test unit to said wheel shaft. The adapter plate is designed such that, when fixedly connected to said wheel hub but disconnected from said dynamometer test
(Continued)

unit, said adapter plate is arranged to support the vehicle to allow relocation of said vehicle while supported by said adapter plate.

13 Claims, 4 Drawing Sheets

(58) Field of Classification Search
 USPC .................................................. 73/862.08
 See application file for complete search history.

(56) References Cited

U.S. PATENT DOCUMENTS

| | | | |
|---|---|---|---|
| 4,277,972 A * | 7/1981 | Wolschlager | G01M 15/044 |
| | | | 73/862.16 |
| 4,669,318 A | 6/1987 | Angstrom | |
| 8,001,835 B2 * | 8/2011 | Engstrom | G01L 3/20 |
| | | | 73/116.06 |
| 8,689,618 B2 * | 4/2014 | Engstrom | G01M 17/0074 |
| | | | 73/116.05 |
| 9,109,973 B2 * | 8/2015 | Inhoff | G01M 17/007 |
| 9,893,673 B2 * | 2/2018 | Engstrom | H02P 29/62 |

FOREIGN PATENT DOCUMENTS

| | | |
|---|---|---|
| DE | 202010006682 U1 | 8/2010 |
| DE | 102010016587 A1 | 10/2011 |
| DE | 202010018277 U1 | 6/2015 |
| JP | 2005148029 A | 6/2005 |
| KR | 20070113830 A | 11/2007 |
| WO | 2007133154 A1 | 11/2007 |

OTHER PUBLICATIONS

International Search Report and Written Opinion dated Aug. 23, 2017 in corresponding international application No. PCT/SE2017/050573 (8 pages).

* cited by examiner

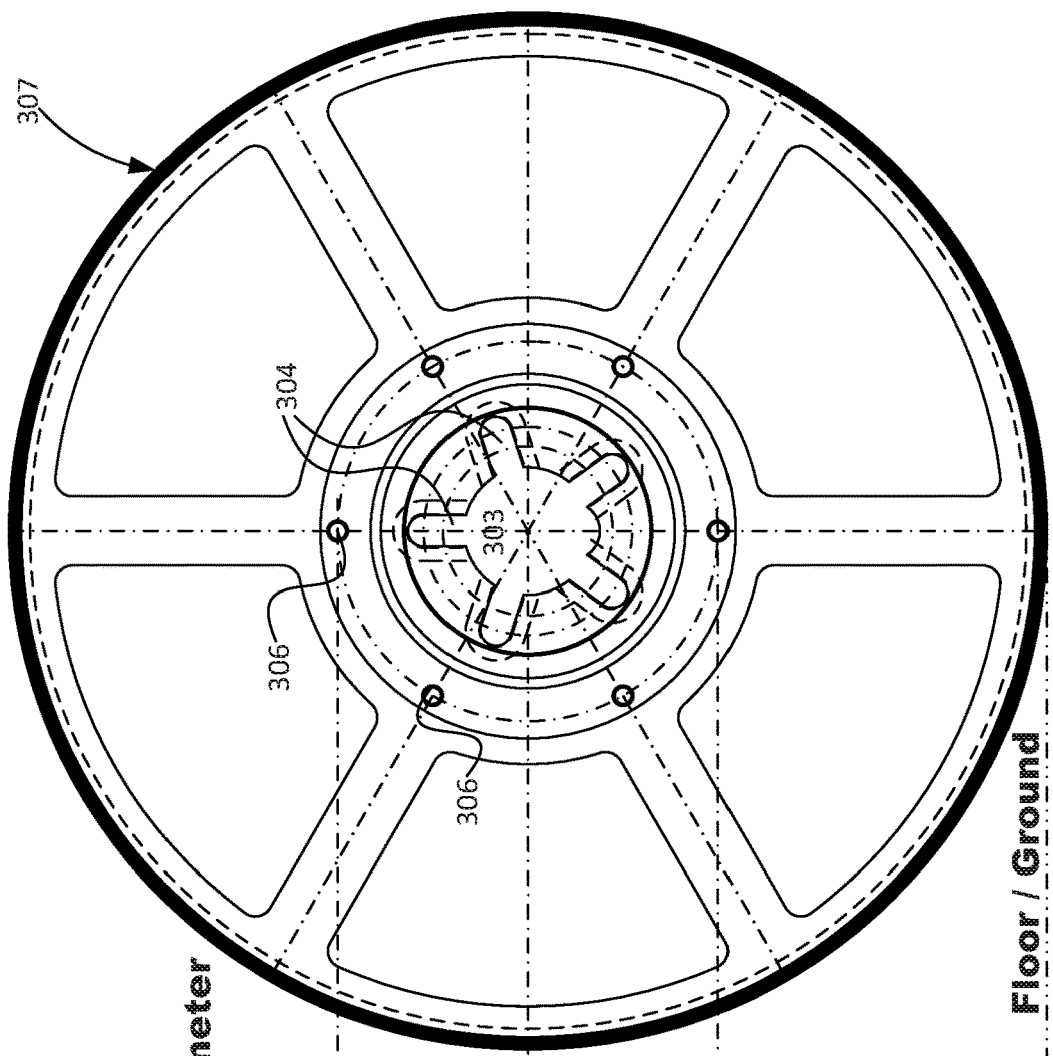
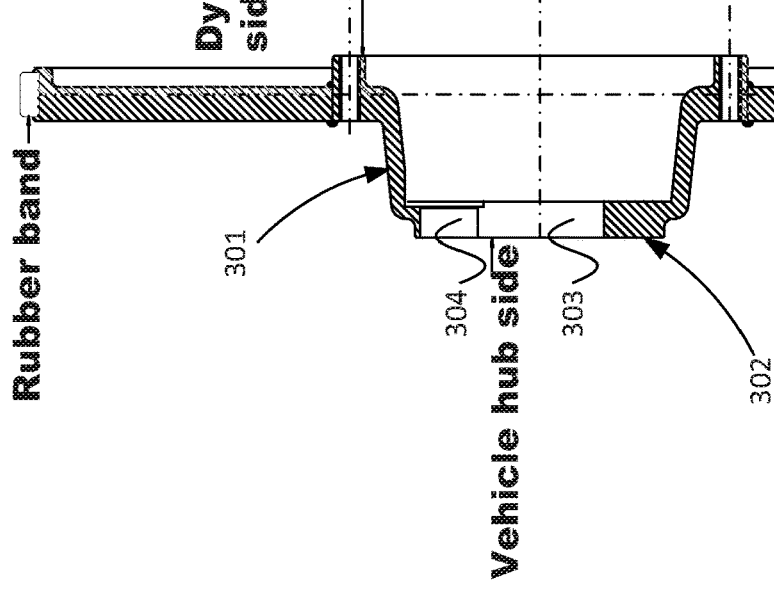

METHOD AND SYSTEM FOR USE IN DYNAMOMETER TESTING OF A MOTOR VEHICLE

CROSS-REFERENCE TO RELATED APPLICATIONS

This application is a U.S. National Stage application of PCT/SE2017/050573, filed May 30, 2016 and published on Dec. 7, 2017 as WO/2017/209681, which claims the benefit of Swedish Patent Application No. 1650758-4, filed May 31, 2016, all of which are hereby incorporated by reference in their entireties.

FIELD OF THE INVENTION

This invention relates to dynamometer testing of vehicles, and in particular to a method for use when dynamometer testing vehicles having at least one wheel shaft and a power source for applying power to said first wheel shaft.

BACKGROUND OF THE INVENTION

Dynamometer testing of vehicles is known per se, and can, for example, be carried out by roller type (rolling road) dynamometers equipped with large rollers that support the vehicle wheels, and which are used to apply a brake torque to the drive wheels of the vehicle. Such systems, however, are not always capable of providing the desired measurement accuracy and/or freedom of measurement.

Another kind of vehicle dynamometer systems for dynamometer testing of vehicles is disclosed in U.S. Pat. No. 4,669,318 (Ångström). This document relates to an apparatus for dynamometer testing of vehicles, where load absorbing means in the form of a hydrostatic pump assembly has an input shaft for engagement with a driven wheel shaft of a vehicle to be tested. Each driven wheel shaft is fixedly connected to an individual apparatus of this kind, whereby a total effective torque from the vehicle can be accurately measured.

It is also possible to perform more complex tests using a dynamometer testing system of the kind disclosed in U.S. Pat. No. 4,669,318, both for two-wheel drive systems, and also for four-wheel drive systems. Such more complex testing is, for example, disclosed in the International patent application WO2007/133154 A1 (Engstroem).

However, vehicle transmissions are becoming increasingly complex, and may include various kinds of power sources for providing power to wheel shafts of the vehicle. These power sources can be arranged to provide propelling powers, but also braking powers, e.g. when used for regenerative braking. The increased complexity of vehicle transmissions provides corresponding challenges for dynamometer testing systems. Furthermore, there is also an increasing desire to perform measurements that allows testing taking into account situations that may occur during real life driving of the vehicle on a road, such as climate related conditions that may affect the behavior of the vehicle, cold starts etc.

Aim and Most Important Features of the Invention

It is an object of the present invention to provide a dynamometer test system that facilitates repeated tests of a vehicle.

According to the present invention, it is provided a vehicle dynamometer system for dynamometer testing of a vehicle, comprising at least one dynamometer test unit having a power source, the power source comprising an output shaft arranged for, in use, rotation with a vehicle wheel shaft, the system further comprising an adapter plate, said adapter plate comprising means for allowing fixed connection to a wheel shaft being tested, said adapter plate further comprising means for allowing fixed connection of the adapter plate to the output shaft of said dynamometer test unit to thereby connect the output shaft of the dynamometer test unit to said wheel shaft. The system is characterized in that said adapter plate is designed such that, when fixedly connected to said wheel hub but disconnected from said dynamometer test unit, said adapter plate is arranged to support the vehicle to allow relocation of said vehicle while supported by said adapter plate.

The use of vehicle dynamometer systems of the kind described above, i.e. systems where dynamometer test units comprising a dynamometer power source are connected to the wheel shafts of a vehicle are capable of providing accurate measurement results when testing vehicles. For example, vehicles can be tested during rapid accelerations, and wheel torque throughout the vehicle engine speed range can be measured in an accurate manner.

However, as was mentioned above, vehicle transmissions are becoming increasingly complex which gives rise to further desires regarding testing of the vehicle. Oftentimes it is also desirable to perform repeated tests, i.e. performing the same test a number of times, where it can be desired to perform the tests repeatedly with the same initial conditions. For example, it may be said desirable to perform a test a number of times for a cold started vehicle, that is, a vehicle that has not been operated for some time. It may also be desirable to perform tests in various conditions, such as in various surrounding temperatures or for various initial temperatures of the vehicle. Also, it may be desired to test a vehicle or vehicle components for longer periods of time, e.g. to test service life expectancy.

If such tests are to be performed a substantial amount of waiting time may be required between tests in order to allow the vehicle to cool down to a desired extent. Also, it may be desirable to cool off the vehicle to some temperature, e.g. a temperature below zero. If component service life is to be tested, the same vehicle may be set up for testing a large number of times to obtain a total desired accumulated testing time. Since it may take a substantial amount of time for the vehicle to cool off to a desired degree or to be cooled down to a desired temperature, or when the vehicle otherwise is subject to a number of repetitive tests, it is in general required that the vehicle is disconnected from and moved away from testing equipment in order to allow testing of another vehicle using the dynamometer test system in the meantime, e.g. to thereby obtain a higher level of utilization of the dynamometer test system.

Such relocation of the vehicle, however, require that the vehicle is disconnected from the dynamometer test units and the wheels remounted to the wheel shafts. Oftentimes at least two dynamometer test units are used, i.e. one dynamometer test unit for each half shaft (left and right) of a front wheel axle or a rear wheel axle. Also, for example with regard to a four-wheel-drive vehicle, dynamometer test units may be connected to each wheel shaft. This may, however, be the case not only in regard of all-wheel-drive vehicles but also for vehicles where only one axle contains drive wheels but where it may be required or desirable to set also non-driven wheels in rotation during testing. This means that for each relocation of the vehicle, the dynamometer test units must be disconnected so that the vehicle wheels can be remounted to the vehicle in order to allow relocation of the vehicle pending an upcoming test during which waiting time other vehicles may be tested.

The present invention provides a method and system for facilitating such relocation of the vehicle. In particular, this is accomplished through the use of an adapter plate which is arranged to be fixed to the wheel shaft, e.g. through the use of fixing means such as wheel fasteners, e.g. wheel nuts, bolts, lugs, and/or studs, being used to secure the wheel to the wheel hub. The adapter plate can be arranged to be rigidly coupled to the wheel shaft, or at least in a rotationally fixed manner to rotate with the wheel shaft.

For example, the adapter plate may comprise holes corresponding to the particular lug/stud pattern being used, and be attached to the wheel hub. Alternatively, the adapter plate may be provided with e.g. slots to allow a single adapter plate to be used for a plurality of lug/stud patterns.

The adapter plate can further be arranged to fixedly connected to an output shaft of a dynamometer test unit to thereby couple the output shaft of the dynamometer test unit to the wheel shaft of the vehicle being tested, so that during testing, the wheel shaft rotates with the output shaft of the dynamometer test unit. This can be accomplished, for example by means of e.g. a flanged being rigidly attached to, or forming part of an output shaft of the dynamometer test unit so that the adapter plate and dynamometer test unit can be coupled together using suitable fasteners. According to embodiments of the invention, the adapter plate is arranged to be connected to wheel hub and/or dynamometer test unit by means of any other suitable means. For example, spline couplings may be used to obtain a rotationally fixed coupling between adapter plate and wheel hub and/or dynamometer test unit. Such coupling may be advantageous e.g. regarding the coupling between adapter plate and dynamometer test unit. For example, the dynamometer test unit may comprise a male/female part of a spline coupling that is arranged to engage with a corresponding female/male part of the adapter plate, where the dynamometer test unit may be arranged to, when the vehicle is in position for testing, be maneuvered to engage with the corresponding splines part of the adapter plate. Following engagement, the dynamometer test unit may e.g. be secured from movement in axial direction to ensure a maintained rotationally fixed coupling throughout the test.

According to the invention the adapter plate, in addition, is designed such that, when still being secured to the wheel shaft but being released from the dynamometer test unit, the adapter plate supports the vehicle by taking the place of the wheel to allow for relocation of the vehicle pending a further test. In this way, the vehicle can be relocated supported by the adapter plate so that the removed vehicle wheels need not be remounted between tests. Hence the vehicle can be supported by the adapter plate the time that lapses between tests of the vehicle.

The adapter plate can be manufactured from any suitable metal such as a metal, e.g. aluminum or steel, or, for example, from a composite material, or any other suitable material, such as a ceramic material. In particular when testing electric vehicles, a material providing galvanic isolation, or the coupling otherwise providing galvanic isolation between wheel hub and dynamometer test unit may be advantageous, e.g. to avoid earthing of the vehicle through the dynamometer test unit. Such earthing may render problems e.g. when simultaneously charging and testing an electric vehicle.

Furthermore, the design of the adapter plate may be solid apart from suitable means such as holes and/or slots for allowing attachment according to the above, but the adapter plates may also be of any suitable design for as long as a desired weight can be supported. For example, the adapter plate may be of a spoke design. Preferably the adapter plate is designed to carry at least a weight normally being carried by a vehicle wheel, e.g. a weight in the range 250-1000 kg for a passenger car.

The adapter plate may be designed with a diameter ensuring a non-negative, i.e. positive belly clearance for all or a plurality of vehicles such as passenger cars being subjected to tests to allow relocation. Oftentimes relocation is performed indoors and/or on level surfaces such as floors so that only a very small belly clearance is required in comparison to belly clearance required in real life driving. Hence, the adapter plate need only provide a clearance sufficient to accomplish the desired relocation of the vehicle. Furthermore, the vehicles need not be relocated by being powered by the vehicle engine, but the vehicles may instead be relocated using e.g. specially designed vehicle movers. Such vehicle movers are known to the person skilled in the art. Naturally, relocation by human force is also possible.

However, according to embodiments of the invention, the adapter plate may be designed to have a diameter substantially corresponding to the wheel diameter normally being used on the vehicle, or a diameter that provides desired functionality for most or all vehicles. In this way, the same or substantially the same belly clearance can be ensured, or at least a sufficient belly clearance.

According to one embodiment, the diameter of the adapter plate is at least 450 mm since in general at least this diameter is required to ensure that a sufficient belly clearance is obtained. According to one embodiment the adapter plate has any diameter in the interval 500 mm to 750 mm. According to one embodiment, the adapter plate has any diameter in the interval 250 mm to 800 mm.

Furthermore, and perhaps in particular if the adapter plate is made from a hard material such as metal, the outer circumference may be provided with a layer of a softer and/or higher-friction material, such as e.g. rubber/rubber composition to improve maneuverability and/or reduce sound and/or wear on the surface on which the vehicle is present when relocating the vehicle. Alternatively, a layer of any other suitable material, such as e.g. polyurethane, may be used.

The invention also relates to a method for use in dynamometer testing of a vehicle according to the above, wherein the method includes:

relocating said vehicle using said adapter plate, wherein said vehicle is relocated using an adapter plate being designed such that, when rigidly coupled to said wheel hub but disconnected from said dynamometer test unit, said adapter plate support the vehicle during relocation.

Consequently, according to the invention, it is provided adapter plates that allow for relocation of the vehicle without the need for remounting the actual vehicle wheels. In this way, a vehicle that has been subjected to one test can be relocated to a suitable area pending a further test, and when the vehicle again is to be tested the time for setting up the test can be significantly reduced since the adapter plates are already attached to the vehicle and ready to be fixedly connected to the dynamometer test units. In this way substantial amounts of time and effort can be saved.

Furthermore, when testing vehicles, adapter plates may be selected not only on the basis e.g. of radius to support the vehicle when relocating the vehicle, but adapter plates of different weights may also be provided e.g. to allow testing using a desired moment of inertia of dynamometer test unit and/or wheel shaft. In this way, e.g. torsional oscillations/vibrations in the powertrain can be tested and/or real life driving on roads and/or tyre-to-road interaction be tested with high accuracy. The adapter plate can hence be selected e.g. to obtain desired and different testing conditions, where the adapter plate can be selected so that the dynamometer test unit mimics the wheel with high accuracy, but where heavier adapter plates can be used e.g. to further evaluate torsional vibrations in the powertrain.

According to embodiments of the invention, hub centering rings may be utilized in a manner similar to when used with wheel rims to facilitate centering the adapter plate to the wheel hub.

The system and method according to the invention can be performed in a vehicle dynamometer system where the dynamometer test units are of any suitable kind, e.g. having an electrical machine and/or hydraulic pump as power source for applying power to a wheel shaft being tested. Consequently, the dynamometer test unit may be of a kind having two (or more) dynamometer power sources for providing power to a same wheel shaft of the vehicle, where one of said power sources can be an electrical machine. According to one embodiment, the dynamometer test unit is designed for testing passenger cars. The invention is also suitable for use in dynamometer testing of motorcycles having two or more wheels, where the wheels are attached to the motorcycle in a car-like manner, which is becoming increasingly common. In case of motorcycles, it may often be sufficient that only one wheel (wheel shaft) is connected to a dynamometer test unit.

Finally, it is also contemplated that the dynamometer test unit may be designed such that connection to the adapter plate while the vehicle is supported by the adapter plate(s) is possible, and where, when connected to the adapter plate, the dynamometer test unit may be raised, e.g. through the use of built-in lifting means, to clear the adapter plate(s) from the floor while simultaneously supporting the weight of the vehicle.

Further features of the present invention and advantages thereof will become clear from the following detailed description of illustrative embodiments and from the attached drawings.

BRIEF DESCRIPTION OF DRAWINGS

The invention will now be described in greater detail with reference to the drawings, wherein:

FIGS. 3A-B shows an exemplary adapter plate according to the invention.

DESCRIPTION OF EXEMPLARY EMBODIMENTS

Figure 1:
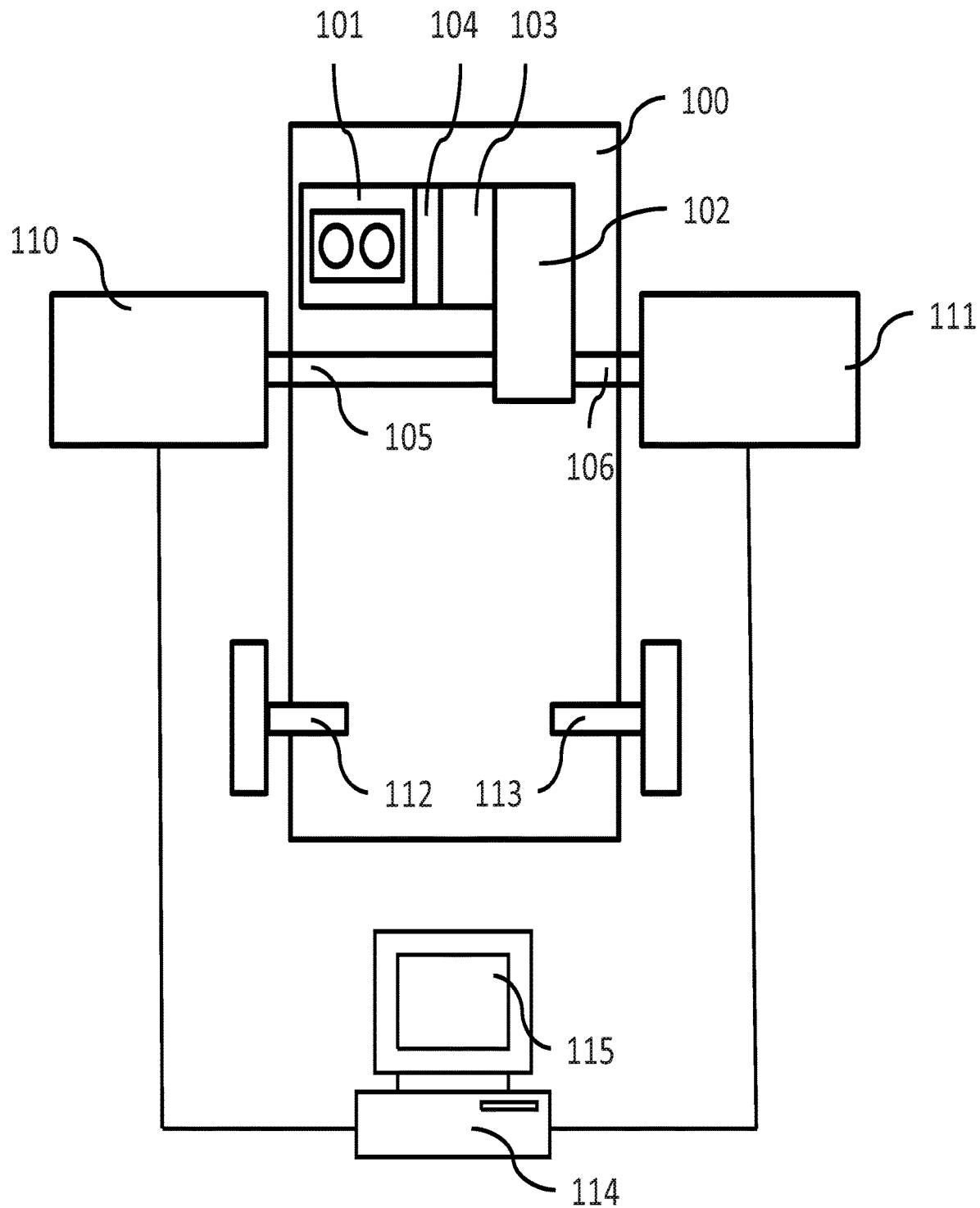
FIG. 1 shows an exemplary vehicle dynamometer system according to the present invention.

FIG. 1 discloses a vehicle 100 set up for being tested with a vehicle dynamometer system according to the present invention.

The vehicle 100 is a two-wheel drive vehicle, and includes front axle wheel shafts, or half shafts 105, 106, and rear axle wheel shafts 112, 113. The wheels of the vehicle 100 are not shown due to the vehicle being set up for dynamometer testing.

The disclosed vehicle 100 includes a drive train, which includes a power source such as a combustion engine 101 which is connected to a gearbox 102. The gearbox 102 can be of any suitable kind and, e.g., consist of a manual transmission or an automatic transmission. The front axle wheel (half) shafts 105, 106 extend from the gear box to the front axle wheels of the vehicle 100.

A vehicle dynamometer system is connected to the vehicle 100, and includes dynamometer test units 110, 111. The dynamometer test units 110, 111 are connected to a measuring and control system 114, such as e.g. a computer with associated display 115, by means of which the tests are controlled, and by means of which an operator of the system can initiate tests and provide necessary information for performing the dynamometer tests. The two test units 110, 111 are basically identical and operate in the same way.

During testing, the measuring and control system 114 transmits control signals to the dynamometer test units to request desired load (torque) and rotational speed. Torque and rotational speed can be measured in different ways, as explained below. The dynamometer test units 110-111 can consist of substantially identical test units, and are described more in detail in FIG. 2.

Figure 2:
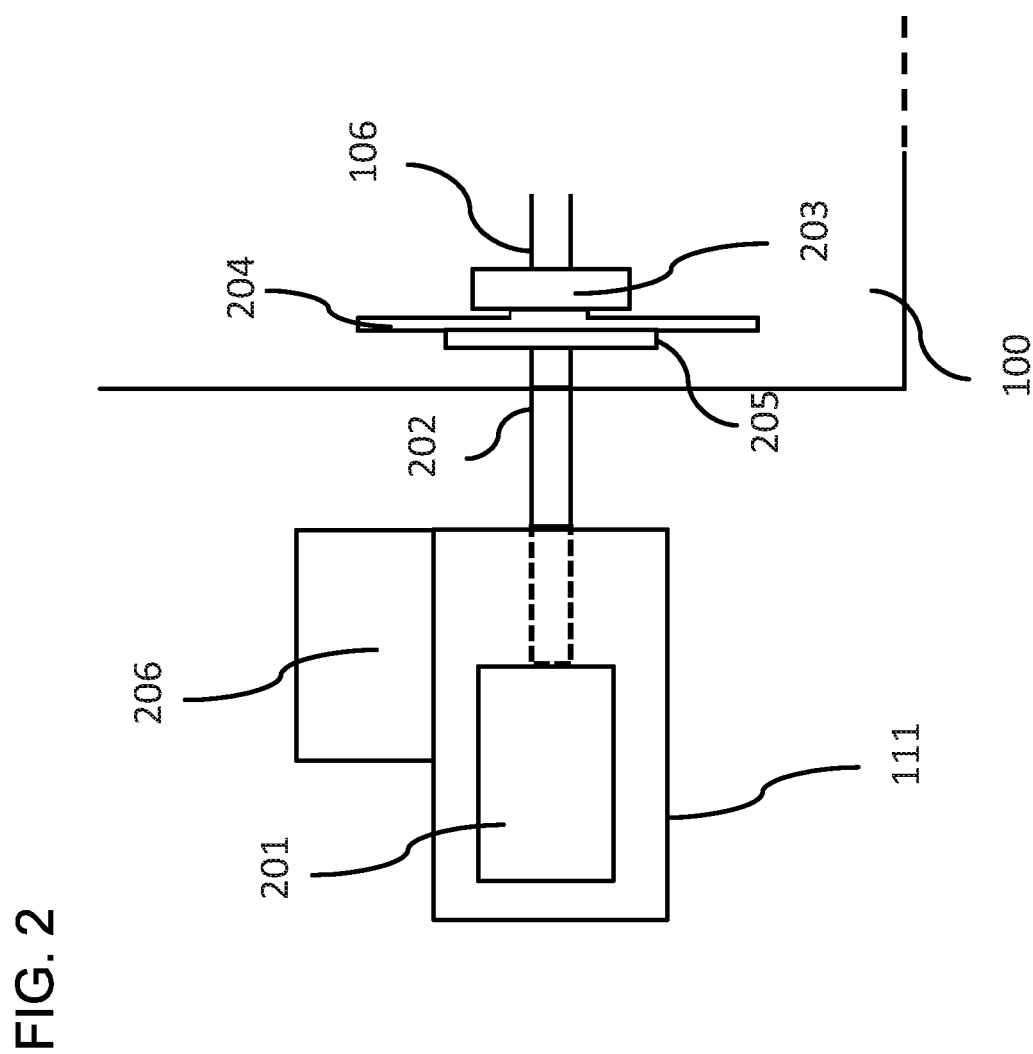
FIG. 2 shows a dynamometer test unit of the system disclosed in FIG. 1 more in detail.

FIG. 2 shows an example of the set-up for one half shaft more in detail. Each dynamometer test unit 110, 111 includes a dynamometer in the form of a power source assembly, e.g. comprising one or more hydrostatic pumps 201. The power source assembly is further provided with means for measuring the torque applied to an output shaft 202 of the test unit 111. The use of a hydrostatic pump assembly as power-absorbing means in the dynamometer is only exemplary. The invention can also be realized with other types of power-absorbing means. For example, an electrical machine may be utilized as power source of a test unit 111 to apply torque to the wheel shaft of the vehicle. A combination of power sources may also be utilized in each test unit, i.e. plural power source may be utilized to apply torque to a wheel shaft. For example, any combination of one or more hydrostatic pump assembly and/or one or more electrical machines being connected to a single wheel shaft. Such solutions are described in earlier applications having the same applicant/inventor as the present application.

The dynamometer further comprises a support 206 carrying the weight of the elements of the test unit supported thereby as well as a portion of the weight of the car being tested. The support further carries the torque applied to the dynamometer by the driven vehicle shaft 106 and prevents the test unit from rotating. Exemplary designs of the dynamometer test unit and vehicle dynamometer system can be found in previous applications from the applicant and/or inventors of the present application.

During testing, the output shaft 202 of the test unit 111 is arranged to be rigidly connected to a wheel shaft 106 of the vehicle 100. The rigid connection is accomplished by removing the vehicle wheel and attaching the output shaft 202 of the dynamometer test unit to the wheel hub 203 using a circular adapter plate 204, so as to obtain a rigid connection between vehicle 100 and dynamometer test unit 111 in a simple manner.

The adapter plate 204 is adapted to fit the outer or wheel-carrying end of the half shaft 106 of the car 100 and to be secured by fasteners in place of the rim of the wheel.

The adapter plate 204 can be rigidly but releasably fastened e.g. to the wheel hub 203, e.g. utilizing the existing wheel fasteners of the vehicle 100, or fasteners of a similar kind e.g. differing in length. The rigid connection has, inter alia, the advantage that rotational speed of the wheel shaft can be measured by a suitable sensor measuring rotational speed of the output shaft 202 of the hydrostatic pump assembly 201. The adapter plate 204 is further fixedly connected to the output shaft 202 of the dynamometer test unit 111. This can be accomplished, for example using a circular coupling flange 205 which e.g. can be welded to a clamped-on collar on the output shaft 202. The adapter plate 204 is rigidly but releasably secured by means of fasteners such as bolts to the coupling flange 205. The adapter plate is further arranged to be axially aligned with the coupling flange 205 so that the half shaft 106 thereby also is aligned or substantially aligned with output shaft 202, the output shaft 202 and half shaft 106 thereby being rotationally locked to each other.

The dynamometer test units 111, 112, which e.g. can be standing freely on a floor, are thus connected to the vehicle only by means of a (rigid) coupling to the wheel shafts (wheel hubs) (and possibly some kind of electronic wire connection for communication with the vehicle control system), and may also be arranged to "carry" the weight of the vehicle in place of the wheel that has been taken off. This is known per se e.g. from earlier patent applications having one or more of the inventors of the present invention as inventors and/or the applicant of the present application as applicant. Also the testing is known per se e.g. from said earlier patent applications.

As was mentioned above, according to the invention the adapter plate 204 is designed such that the vehicle when being disconnected from the output shaft 202 can be supported by the adapter plate 204 without remounting the vehicle wheel. During testing, the weight of the vehicle is supported by the dynamometer test unit 111 and the height of the output shaft being controlled such that the adapter plate rotates freely without touching ground during testing. As is known per se, the output shaft is preferably journaled close to the coupling flange 205 to reduce bending moment that the set-up is subjected to during testing.

An exemplary adapter plate 204 according to the invention is shown in FIGS. 3A-B. FIG. 3A shows a cross sectional view of the adapter plate 204, and FIG. 3B shows a front view of the adapter plate 204. The adapter plate 204 comprises a protruding portion 301 on the side designed to face the wheel hub of the vehicle. The protruding portion 301 is further provided with a surface 302 being designed to contact a corresponding surface on the wheel hub in place of the rim of a wheel. Furthermore, the adapter plate comprises a center hole 303 for receiving a corresponding protruding portion of the wheel hub assembly. That is, a hole corresponding to the conventional center hole of the wheel rim. The center hole 303 can be arranged to be adapted to the vehicle being tested or, alternatively, have a larger diameter so that e.g. centering rings can be used if required to facilitate centering of the adapter plate to the wheel hub of the vehicle being tested.

Furthermore, the adapter plate is provided with slots 304 designed to take the place of conventional wheel rim holes, where e.g. conventional fasteners such as nuts or bolts can be used to secure the adapter plate to the wheel hub. The use of slots instead of holes increases usability of a single adapter plate for vehicles having different bolt/stud circle diameters, where the center hole can be designed to fit a plurality of different lug/stud patterns.

For example, the adapter plate may comprise holes corresponding to the particular lug/stud pattern being used, and be attached to the wheel hub. Alternatively, the adapter plate may be provided with e.g. slots to allow a single adapter plate to be used for a plurality of lug/stud patterns.

The adapter plate further comprises holes 306 to be used for aligning with a flange according to the above and for securing the adapter plate to the flange using suitable fasteners.

As was mentioned above, the adapter plate can be manufactured from any suitable material such as a metal, e.g. aluminum or steel, or, for example, from a composite material, or any other suitable material. Although the design may be solid it can be preferable to use e.g. a spoke design as shown in FIGS. 3A-B. since the adapter plate is intended to, when being disconnected from the dynamometer test unit, carry the weight of the vehicle in place of a wheel there are design constraints in this regard, although the forces that the adapter plate is being subjected during relocation in general is considerable smaller in comparison to forces a wheel is subjected to during real life driving.

The adapter plate may be designed in various diameters to account for differences in wheel diameter of different vehicles. However, since the adapter plate is primarily intended for use to facilitate relocation of a vehicle e.g. within a testing vicinity, a single adapter plate having a single diameter may be used to fulfil these requirements with regard to e.g. most or all passenger cars. Essentially the requirement is to provide a sufficient belly clearance to allow relocating the vehicle without causing damage to vehicle chassis/wheel suspension. Oftentimes relocation is performed indoors and/or on level surfaces such as floors so that only a very small belly clearance is required in comparison to belly clearance required in real life driving. Also, as was mentioned above, the vehicle need not be relocated by motoring using the vehicle power source, but a vehicle mover may be used to effect the relocation. The diameter of the adapter plate may be designed to be least 250 mm since in general at least this diameter ensure that a sufficient belly clearance is obtained irrespective of passenger car being used.

According to one embodiment the adapter plate has any diameter in the interval 500 mm to 750 mm. According to one embodiment, the adapter plate has any diameter in the interval 250 mm to 800 mm.

FIGS. 3A-B further shows an outer circumference of the adapter plate being provided with a rubber layer 307 to increase friction, and thereby maneuverability, and to reduce wear on the surface on which the vehicle is being transported during relocating of the vehicle. A layer of any other suitable material may be used instead, and the need for an outer layer may depend on the material being used in manufacturing the adapter plate.

Figure 4:
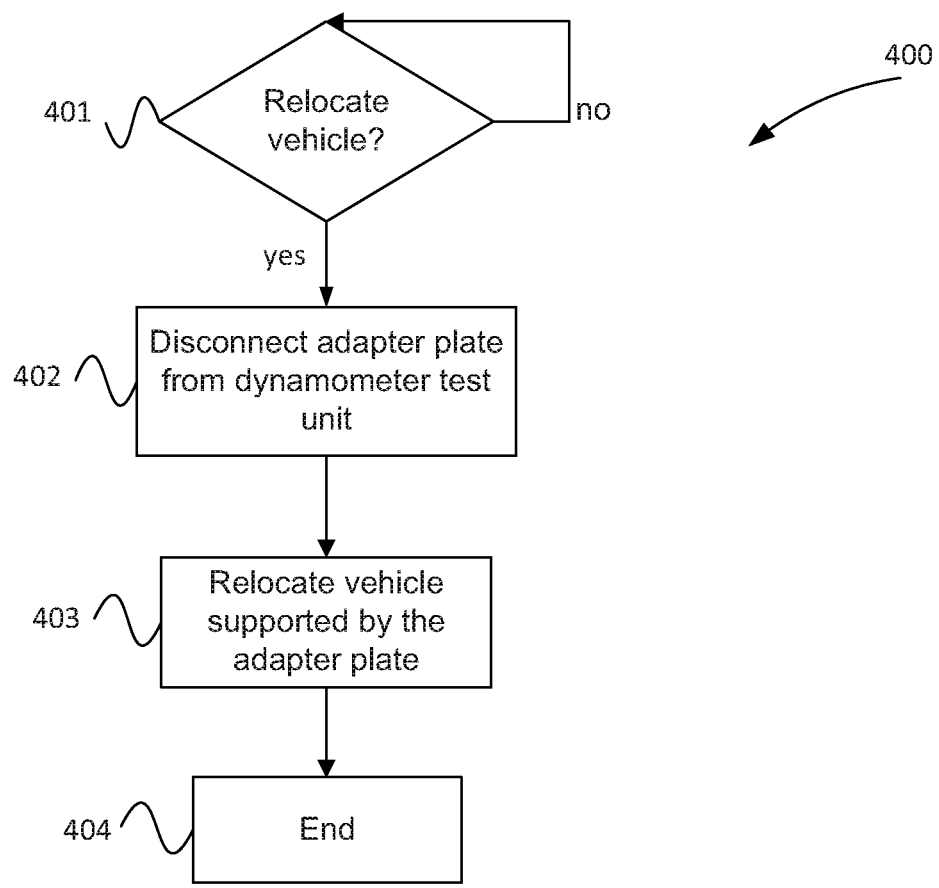
FIG. 4 shows an exemplary method according to the invention.

The invention also relates to methods for relocating a vehicle, and an exemplary method is shown in FIG. 4.

The invention also relates to a method for use in dynamometer testing of a vehicle according to the above. An exemplary method 400 is shown in FIG. 4. The method starts in step 401 where it is determined whether the vehicle is to be relocated pending a further test of the vehicle to be performed. When this is the case, step 402, the adapter plate is disconnected from the dynamometer test unit while still remaining secured to the wheel shaft (half shaft). Similarly all tested shafts can be arranged to be disconnected in the same manner leaving the adapter plates secured to the vehicle. Since the adapter plates preferably do not touch ground during testing, e.g. jacks can be used to support the vehicle while the adapter plates are disconnected form the dynamometer test unit.

When all adapter plats have been disconnected, and possibly wiring used in the testing, the vehicle is free to be relocated, supported by adapter plates only or a combination of adapter plates and wheels, although at least one wheel hub is supported by an adapter plate and no wheel.

Once the vehicle again is to be tested, the vehicle can be relocated to the dynamometer test system supported by the one or more adapter plates. Consequently, according to the invention, it is provided adapter plates that allow for relocation of the vehicle in a manner that significantly may reduce the time it takes to set up a test since the adapter plates are already attached to the vehicle and ready to be fixedly connected to the dynamometer test units.

According to the above described example, each dynamometer test unit comprises a single power source consisting of an electrical machine. According to one embodiment, the dynamometer test unit comprises two or more individually controllable power sources, which can be electrical machines, hydraulic pumps or any suitable combination thereof. If two or more power sources are used for a single dynamometer test unit, the moment of inertia can be separately determined for the power sources so that only moment of inertia (power sources) currently participating in the measurements are used when compensating the results.

Above, the present invention has been exemplified in connection with testing of a particular kind of vehicles. Naturally, the present invention is applicable for testing of any kind of vehicle, such as hybrid vehicles or conventional two or four wheel drive combustion engine vehicles, or any other kind of hybrid vehicle other than what has been disclosed above. Consequently more than two dynamometer test units can be used for being connected to more than two wheels, and it is also contemplated that only one wheel shaft is connected to a dynamometer test unit, e.g. if an electric motor of the vehicle acts only on one wheel shaft.

Finally, it should be understood that the present invention is not limited to the embodiments described above, but relates to and incorporates all embodiments within the scope of the appended independent claims.

The invention claimed is:

1. Vehicle dynamometer system for dynamometer testing of a vehicle, comprising at least one dynamometer test unit having a power source, the power source comprising an output shaft arranged for, in use, rotation with a vehicle wheel shaft, the system further comprising an adapter plate, said adapter plate comprising means for allowing fixed connection to a wheel hub of a wheel shaft being tested, said adapter plate further comprising means for allowing fixed connection of the adapter plate to the output shaft of said dynamometer test unit to thereby connect the output shaft of the dynamometer test unit to said wheel shaft, characterized in that said adapter plate is designed such that, when fixedly connected to said wheel hub but disconnected from said dynamometer test unit, said adapter plate is designed to support the vehicle to allow relocation of said vehicle while supported by said adapter plate.

2. System according to claim 1, characterized in that said adapter plate is designed to support the vehicle to allow relocation of said vehicle while supported by said adapter plate without remounting a wheel to said wheel shaft.

3. System according to claim 1, characterized in that said adapter plate has a diameter being such that when rigidly coupled to said wheel hub but disconnected from said dynamometer test unit said vehicle is relocatable by being supported by said adapter plate.

4. System according to claim 1, characterized in that said adapter plate is designed to have a diameter being such that, when supporting a vehicle, a positive belly clearance of said vehicle is obtained.

5. System according to claim 1, further including:
a rubber, or rubber composition, layer provided on an outer rim of said adapter plate to contact the surface on which a vehicle is present when supporting said vehicle.

6. System according to claim 1, characterized in that the adapter plate has a diameter of at least 450 mm.

7. System according to claim 1, characterized in that the adapter plate has a diameter in any of the intervals: 250 mm to 800 mm; 500 mm to 750 mm.

8. System according to claim 1, characterized in that the adapter plate has a spoke design.

9. Adapter plate designed for use in a vehicle dynamometer system for testing of a vehicle according to claim 1, said adapter plate comprising means for allowing fixed connection to a wheel hub of a wheel shaft being tested, said adapter plate further comprising means for allowing fixed connection to an output shaft of a dynamometer test unit of said vehicle dynamometer system to thereby connect the output shaft of the dynamometer test unit to said wheel shaft, characterized in that said adapter plate is designed such that, when fixedly connected to said wheel hub but disconnected from said dynamometer test unit, said adapter plate is designed to support the vehicle to allow relocation of said vehicle while supported by said adapter plate.

10. A method for use in dynamometer testing of a vehicle comprising at least one dynamometer test unit having a power source, the power source comprising an output shaft arranged for rotation with a vehicle wheel shaft, the system further comprising an adapter plate, said adapter plate comprising means for allowing fixed connection of the adapter plate to a wheel hub of said vehicle wheel shaft, and said adapter plate further comprising means for allowing fixed connection to the output shaft of said test unit to thereby rigidly couple the output shaft of the dynamometer test unit to said wheel shaft, characterized in
relocating said vehicle using said adapter plate, wherein said vehicle is relocated using an adapter plate being designed such that, when rigidly coupled to said wheel hub but disconnected from said dynamometer test unit, said adapter plate supports the vehicle.

11. A method according to claim 10, further including:
supporting at least two wheel shafts by an adapter plate, respectively, when relocating said vehicle.

12. A method according to claim 10, wherein said adapter plate has a diameter substantially corresponding to a wheel diameter of the vehicle being tested.

13. A method according to claim 10, further including:
selecting an adapter plate that, in addition, is an adapter plate having a weight being selected on the basis of a desired moment of inertia of the dynamometer test unit and/or wheel shaft when testing.

* * * * *